United States Patent [19]
Shamir

[11] Patent Number: 5,991,415
[45] Date of Patent: Nov. 23, 1999

[54] METHOD AND APPARATUS FOR PROTECTING PUBLIC KEY SCHEMES FROM TIMING AND FAULT ATTACKS

[75] Inventor: Adi Shamir, Rehovot, Israel

[73] Assignee: Yeda Research and Development Co. Ltd. at the Weizmann Institute of Science, Rehovot, Israel

[21] Appl. No.: 08/854,464

[22] Filed: May 12, 1997

[51] Int. Cl.[6] .............................. H04L 9/30; H04L 9/00
[52] U.S. Cl. .................................. 380/30; 380/1; 380/2; 380/9; 380/49
[58] Field of Search .................................. 380/9, 30, 49, 380/50, 59, 28, 1, 2

[56] References Cited

U.S. PATENT DOCUMENTS 5,764,766   6/1998   Spratte ................................. 380/28 X

FOREIGN PATENT DOCUMENTS 0682327   11/1995   European Pat. Off. .

OTHER PUBLICATIONS

"Timing Attacks on Implementations of Diffie–Hellman, RSA, DSS, and Other Systems", Paul C. Kocher, Advances in Cryptology—Crypto '96, 16th Annual International Cryptology Conference, Santa Barbara, CA, Aug. 18–22, 1996, pp. 104–113.

P. Kocher, "Cryptanalysis of Diffie–Hellman, RSA, DSS, and Other Systems Using Timing Attacks" technical report, Dec. 7, 1995.

D. Boneh etal "Cryptanalysis in the Presence of Hardware Faults" technical report, Sep. 25, 1996.

E. Biham etal "Differential Fault Analysis of Secret Key Cryptosystems", technical report Oct. 18, 1996.

*Primary Examiner*—Bernarr E. Gregory
*Attorney, Agent, or Firm*—Evenson, McKeown, Edwards & Lenahan, PLLC

[57] ABSTRACT

Improved methods and apparatus are provided for protecting public key schemes based on modular exponentiation (including RSA and Diffie-Hellman) from indirect cryptanalytic techniques such as timing and fault attacks. Known methods for making the implementation of number-theoretic schemes resistant to such attacks typically double their running time, whereas the novel methods and apparatus described in this patent add only negligible overhead. This improvement is particularly significant in smart card and software-based implementations, in which the modular exponentiation operation is quite slow, and doubling its time may be an unacceptable solution.

22 Claims, 2 Drawing Sheets

METHOD AND APPARATUS FOR PROTECTING PUBLIC KEY SCHEMES FROM TIMING AND FAULT ATTACKS

FIELD OF INVENTION

The present invention relates to novel techniques, methods and apparatus, for making number-theoretic public key schemes (including encryption schemes, signature schemes, identification schemes, key management schemes, etc.) resistant to timing and fault attacks.

BACKGROUND OF INVENTION

1. Introduction

The simplest attack on a given cryptosystem is to exhaustively search for the key. There are many variants of this attack (known ciphertext, known cleartext, chosen cleartext, etc.), but they are all based on a procedure which tries the keys one by one until the correct key is encountered. If the key consists of n random bits, the expected running time of this procedure is $2^{(n-1)}$. This attack can be easily foiled by using a large enough n (e.g., n>100).

To attack cryptosystems with large keys, cryptanalysts try to find mathematical or statistical weaknesses which reduce the size of the search space (preferably to 1). Although many techniques and results are classified for national security reasons, it is safe to assume that it is increasingly difficult to find such weaknesses in modern schemes designed by experienced cryptographers and implemented on high speed microprocessors.

To successfully attack strong cryptosystems, the cryptanalyst must use indirect techniques. This is best done when the cryptanalyst is either in close physical proximity to the cryptographic device, or has it under his complete control. The cryptographic device is assumed to be a black box which contains a known algorithm and an unknown key. The cryptanalyst cannot open this box and read its key, but he can observe its behavior under various circumstances.

One of the best known examples of such an indirect attack is TEMPEST, which tries to deduce the key by analyzing electromagnetic radiation emanating from the black box during the computation of the ciphertext. Techniques for applying and preventing such attacks have been extensively studied for more than 50 years, and by now this is a well understood problem.

Two powerful indirect attacks were discovered and published recently: In December 1995, P. Kocher, "Cryptanalysis of Diffie-Hellman, RSA, DSS, and Other Systems Using Timing Attacks," technical report, 12/7/95, described a timing attack, and in September 1996, D. Boneh, R. A. Demillo and R. J. Lipton, "On the Importance of Checking Computations," technical report, 9/25/96 (an extended version appears in the Proceedings of Eurocrypt 97, May 1997) described a fault attack. Both attacks were originally designed for and are most successful against public key schemes based on number theoretic principles, such as RSA, but they were later extended to classical cryptosystems as well (e.g., by E. Biham and A. Shamir, "A New Cryptanalytic Attack on DES," technical report, 10/18/96. An extended version appears in the Proceedings of Crypto 97, August 1997).

Such attacks are particularly useful when the scheme is implemented on a smart card, which is distributed by a bank, computer network, cellular phone operator, or pay-TV broadcaster to its customers. Hackers do not usually have the financial and technical resources required to read the contents of the key registers inside the smart card, but they have complete control on the input/output, clock, reset, and power connections of the smart card. They can carefully measure the duration of the various operations, how much power they consume, what happens when the computation is interrupted or carried out under abnormal operating conditions, etc. Since the tests are carried out in the privacy of the customer's home, the card manufacturer cannot prevent them or even learn about their existence.

2. Timing Attacks

Timing attacks are based on the assumption that some of the basic operations carried out during the cryptographic calculation require a non-constant amount of time which depends on the actual values being operated upon. This implies that some information about these unknown intermediate values leaks out by measuring the length of the cryptographic computation. If these intermediate values are computed from known cleartext bits and unknown key bits by a known cryptographic algorithm, the attacker can try to use the leaked intermediate values to deduce the key.

The main difficulty in carrying out this attack is that the attacker knows only the total amount of time required to carry out the cryptographic computation, but not the timing of individual computational steps. Kocher's main contribution is in developing an efficient technique for handling this difficulty in many cases of practical interest.

For the sake of concreteness, we describe Kocher's attack on the RSA cryptosystem. The black box is assumed to contain a publicly known modulus n and a secret exponent d. Given an input number x, the box performs the modular exponentiation $x^d \pmod{n}$ by using the standard square-and-multiply technique. In this description, the symbol "^" is exponentiation and the symbol "_" is a subscript. The result (which can be the decryption of the ciphertext x, the signature of the message x, or the response to a random identification challenge x, depending on the application) is sent out as soon as it is produced, and thus the attacker can measure the total number of clock cycles taken by all the modular multiplications.

Standard implementations of modular multiplication require a non-constant amount of time, since they skip multiplication steps involving leading zeroes, and reduction steps when the result is smaller than the modulus. The attacker chooses a large number of random inputs x, and measures the actual timing distribution $T\_0$ of the modular exponentiation operation carried out by the black box. He then measures for each x (by computer simulation, using his knowledge of how the scheme is implemented) the precise timing of an initial square-only operation, and separately, the precise timing of an initial square-and-multiply operation. The result is a pair of timing distributions $T\_1$ and $T\_2$, which are not identical. All the cryptographic computations carried out in the black box use the same exponent d, and its first bit determines which one of the two computed distributions $T\_1$ and $T\_2$ is the initial part of the experimentally computed $T\_0$. The timing of the remaining steps of the computations can be assumed to be a random variable R, which is normally distributed and uncorrelated with either $T\_1$ or $T\_2$. Since $T\_0$ is either $T\_1+R$ or $T\_2+R$, the attacker can decide which case is more likely by finding which one of the two distributions $T\_0-T\_1$ and $T\_0-T\_2$ has a lower variance.

After finding the first bit of the secret exponent d, the attacker knows the actual inputs to the second computational step, and thus he can apply the same technique (with properly modified experimental and simulated timing distributions $T'\_0$, $T'\_1$, and $T'\_2$) to find the second bit of d. By repeating this procedure about 1000 times, he can compute all the bits of d, and thus break the RSA scheme.

A similar timing attack can be applied to any cryptographic scheme in which the black box raises all its inputs $x\_1, x\_2, \ldots$ to the same secret power d modulo the same known n (which can be either a prime or a composite number). For example, in one of the variants of the Diffie-Hellman key distribution scheme, all the users agree on a prime modulus n and on a generator g of the multiplicative group $Z^*\_n$.

Each user chooses a random secret exponent d, and computes $y=g^d$ (mod n) as his public key. To establish a common secret key with another user, the first user sends out his public key $y=g^d$ (mod n), and receives a similarly computed public key $x=g^e$ (mod n) from the other user. Their common cryptographic key is $z=g^{(d*e)}$ (mod n) which the first user computes by evaluating $x^d$ (mod n). When the first user communicates with several parties, he raises several known values $x\_1, x\_2, \ldots$ to the same secret power d modulo the same known modulus n. By measuring the timing of sufficiently many such computations, the attacker can determine d and thus find all the cryptographic keys $z\_1, z\_2, \ldots$ employed by that user.

The timing attack has to be modified if the computation of $x^d$ (mod n) for a composite modulus $n=p*q$ is carried out by computing $x^d$ (mod p), $x^d$ (mod q), and combining the results by the Chinese Remainder Theorem (CRT). This is a common way of making the computation about 4 times faster when the factorization of n is known. The problem for the attacker is that he does not know the secret factors p and q of the public modulus n, and thus cannot simulate the timing distributions $T\_1$ and $T\_2$. Kocher's solution is to concentrate on the first step of the CRT computation, in which the input x is reduced modulo p. If x is smaller than p, no modular reduction is required, and thus the computation is considerably faster than when x is larger than or equal to p. The attacker thus presents to the black box a large number of inputs x which are very close to each other, and uses the average time of such computations to decide whether these x's are above or below p. A decision procedure for this question can be repeatedly used to find the precise value of p by binary search.

Shortly after the discovery of this attack, researchers tried to develop implementations which are immune to it. The simplest idea is to make sure that all the cryptographic operations take exactly the same amount of time, regardless of the values of the cleartexts and keys. However, achieving this is surprisingly difficult for the following reasons:

(a) In many cases, the implementor wants to run the same algorithm in software on different (and perhaps unknown) machines. An implementation which is constant time on one microprocessor may be variable time on another microprocessor or even on an enhanced version of the same microprocessor.

(b) On a multitasking machine the running time may depend on the amount of free memory, the cache hit rate, the number of external interrupts, etc. This can change a constant time implementation under one set of circumstances into a variable time implementation under another set of circumstances.

(c) If the implementor tries to use a real time clock to force all the computations to take the same amount of time, he must slow all of them down to their worst cases. Since he cannot use any input-dependent optimization technique, the implementation is likely to be unacceptably slow.

The best protective technique proposed so far against Kocher's timing attack on modular exponentiation is to replace each input x by a modified version $y=x*r$ (mod n) where r is a secret random number between 1 and n−1. To compute $x^d$ (mod n), the program computes $y^d$ (mod n) and $r^d$ (mod n), and then uses the multiplicative property of modular exponentiation to compute $x^d$ (mod n) as $y^d/r^d$ (mod n). Since both y and r are unknown, the attacker cannot simulate these computations in order to find the successive bits of d in the non-CRT computation, and cannot perform binary search in the CRT version of the computation. Unfortunately, this randomization technique doubles the expected running time of the computation.

3. Fault Attacks

Fault attacks try to introduce errors into the cryptographic computation, and to identify the key by analyzing the mathematical and statistical properties of the erroneously computed results. Among the many techniques suggested so far for introducing such errors are the use of ionizing radiation, unusual operating temperatures, power and clock glitches, and laser-based chip microsurgery. Some of the attacks are differential (i.e., they carry out both a correct and an erroneous computation with the same input and analyze their differences), while other attacks just use the erroneous results.

The original fault attack on public key cryptosystems was described in Boneh, Demillo and Lipton, and required several cryptographic computations. We now describe an improved version of this attack, due to Aijen Lenstra, which requires a single faulty computation. We assume that the black box uses the RSA scheme to sign a given message x. The computation of $x^d$ (mod n) is carried out with the CRT method by first reducing x modulo p and q to get $x\_1$ and $x\_2$, then computing $y\_1=x\_1^d$ (mod p) and $y\_2=x\_2^d$ (mod q), and finally combining $y\_1$ and $y\_2$ to get the signature y (mod n) with the CRT method. We assume that a single error is introduced at a random time during this computation by applying mild physical stress to the black box. Without loss of generality, we can assume that the error was introduced during the computation of $x\_1^d$ (mod p), and thus instead of getting the correct $y\_1$, the box computed an erroneous $y'\_1$. When $y'\_1$ and $y\_2$ are combined by the CRT method, the box computes an incorrect signature y' which is provided to the attacker.

The main observation is that the attacker knows the signature verification exponent e, for which $y^e=x$ (mod n). Due to the error, $y'^e-x$ is non-zero mod p, but zero mod q, and thus it is a multiple of q which is not a multiple of n. The attacker can thus factor n by computing the greatest common divisor of $y'^e-x$ (mod n) and n, which is an easy computation.

To protect cryptographic schemes against fault attacks, Boneh, Demillo and Lipton recommend that each computation should be carried out twice (preferably by different algorithms). If any discrepancy is found between the two results, the box should not output anything. This provides strong protection from random faults (which are unlikely to affect the two computations in an identical way), but it slows down the computation by a factor of 2. Such a slowdown is particularly noticeable in smart card implementations of public key schemes, which are quite slow to begin with.

SUMMARY OF THE INVENTION

The present invention relates to method and apparatus for providing protective techniques for public key schemes, which provide strong protection against the described timing and fault attacks without incurring the twofold slowdown made necessary by the previously known protective techniques.

The first technique is designed to protect non-CRT implementations of public key schemes against timing attacks. It is applicable to the RSA cryptosystem, RSA digital signature scheme, Diffie-Hellman key distribution scheme, and any other number theoretic scheme in which the black box raises a known input x to a fixed secret exponent d modulo a public n whose factorization is known to the black box.

The second technique is designed to protect CRT-based implementations of public key schemes from both timing and fault attacks. The main problem is how to verify the correctness of the computations of $x\_1^d$ (mod p) and $x\_2^d$ (mod q) without repeating them a second time (or verifying each step separately, which again doubles the running time). The invention provides a novel error-detection technique for such number theoretic computations which is much more efficient.

DETAILED DESCRIPTION OF THE PREFERRED EMBODIMENTS

Figure 1:
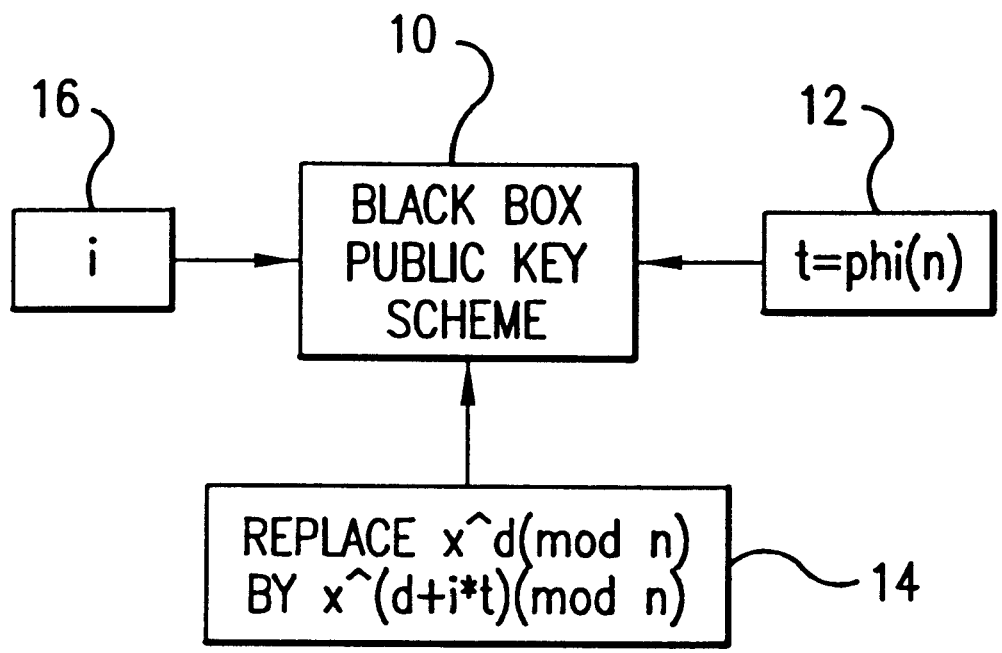
FIG. 1 shows schematically the method and apparatus of the invention as it relates to a first technique designed to protect non-CRT implementations of a public key scheme against timing attacks.

Referring now to the drawings, preferred embodiments will now be described in detail. Since public key schemes and computer hardware and software implementation are well known to those of skill in the art, no description of same is deemed necessary to a full, concise and exact understanding of the present invention.

We now describe two novel protective techniques for public key schemes, which provide strong protection against the described timing and fault attacks without incurring the twofold slowdown made necessary by the previously known protective techniques.

The first technique, shown in FIG. 1, is designed to protect non-CRT implementations of public key schemes against timing attacks. It is applicable to the RSA cryptosystem, RSA digital signature scheme, Diffie-Hellman key distribution scheme, and any other number theoretic scheme in which the black box 10 raises a known input x to a fixed secret exponent d modulo a public n whose factorization is known to the black box.

The main observation is that for each n there exists a number t=phi(n), box 12, such that for any x between 1 and n which is relatively prime to n, $x^t=1$ (mod n). This phi is called Euler's totient function: when n is prime, phi(n)=n−1, and when n=p*q, phi(n)=(p−1)*(q−1). The implementation can thus replace the computation of $x^d$ (mod n) by the computation of $x^{(d+i*t)}$ (mod n) for any integer i without changing the computed result, since $x^{(d+it)}=(x^d)*(x^t)^i=(x^d)*1^i=x^d$ (mod n), box 14.

This equality can be shown to be true even when x is not relatively prime to n, but this case is unlikely to arise in practice. Note also that any integral multiple of GCD((p−1),(q−1)) can replace phi(n) in our choice of t.

The proposed protection technique for public key schemes based on the modular exponentiation operation is to choose a new random secret i, box 16, in each computation, and to replace the computation of $x^d$ (mod n) by the computation of $x^{(d+i*t)}$ (mod n) where t is the precomputed value of phi(n). Since the bits of these (d+i*t) for the various i are different, each exponentiation uses a different sequence of square-and-multiply steps, and thus the attacker cannot use Kocher's timing attack to analyze the timing distribution of several exponentiations, even though all of them compute the same d-th power of their inputs.

The efficiency of this technique is based on the fact that t is always smaller than n, and the randomizing element i can be chosen as a relatively small number. If n and d are 1024 bit numbers, and i is a random 32 bit number (which are the currently recommended sizes), d+i*t is a 1056 bit number. The process of raising the input x to the 1056 bit power d+i*t requires only 3% more square-and-multiply operations than the process of raising x to the original 1024 bit power d. This is much better than the alternative randomization technique described earlier, which doubles the running time.

Figure 2:
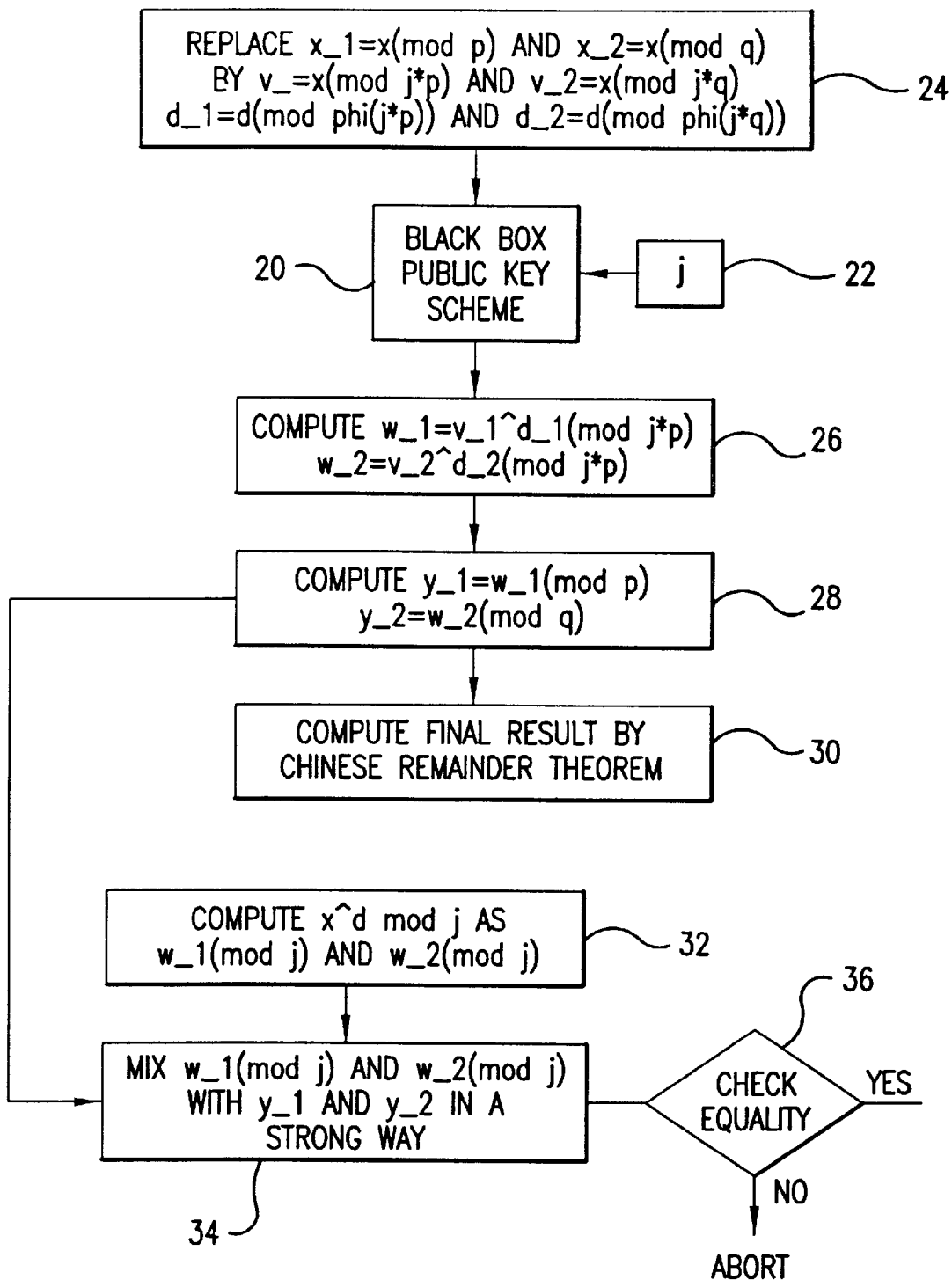
FIG. 2 shows schematically the method and apparatus of the invention as it relates to a second technique designed to protect CRT-based implementations of a public key scheme against both timing and fault attacks.

The second technique, shown in FIG. 2, is designed to protect CRT-based implementations of public key schemes from both timing and fault attacks. The main problem is how to verify the correctness of the computations of $x\_1^d$ (mod p) and $x\_2^d$ (mod q) without repeating them a second time (or verifying each step separately, which again doubles the running time). We now describe a novel error-detection technique for such number theoretic computations which is much more efficient.

In each computation, the black box 20 chooses a new random integer j (the recommended size of j is also 32 bit), box 22. Instead of computing x_1=x (mod p) and x_2=x (mod q) followed by $y\_1=x\_1^d$ (mod p) and $y\_2=x\_2^d$ (mod q), the box computes v_1=x (mod j*p), v_2=x (mod j*q), d_1=d (mod phi(j*p)), and d_2=d (mod phi(j*q)), box 24, followed by $w\_1=v\_1^{d\_1}$ (mod j*p) and $w\_2=v\_2^{d\_2}$ (mod j*q), box 26.

The main observation is that from w_1 and w_2 it is easy to derive y_1 and y_2 by further reductions (namely, y_1=w_1 (mod p) and y_2=w_2 (mod q)), box 28, and thus it is easy to compute the final result y by the Chinese remainder Theorem, box 30. However, we can also obtain the value of $x^d$ (mod j) in two different ways: as w_1 (mod j) and as w_2 (mod j), box 32. We can now use the equality of these two values (which were obtained from the two halves of the computation, and mixed with the derivation of y_1, y_2 in a very strong way), box 34, as a test of correctness: In a faultless computation the two values will always be the same, whereas in a faulty computation (with random faults) the probability that the two values will be the same is about $1/(2^{32})$, see decision box 36 in which an abort is commanded for a faulty computation. This error detection technique is thus sufficient for any application in which the total number of modular exponentiations is significantly smaller than $2^{32}$ (about 4 billion).

The overall time complexity of this implementation is higher by a few percent than the time complexity of standard implementations, since the exponentiations are carried out modulo 512+32=544 bit moduli j*p and j*q instead of 512 bit moduli p and q. However, this is much faster than repeating each exponentiation a second time to verify its correctness.

An additional benefit of this randomization technique is that it also provides protection from timing attacks at no extra cost. Kocher's original attack on CRT-based implementations concentrates on the initial modular reduction (mod p), and uses binary search to find increasingly accurate approximations of p from multiple computations.

By using our proposed technique, each computation uses a different modulus j*p in its initial reduction step, and thus the attacker cannot refine his knowledge of the modulus by analyzing a large number of exponentiations.

There are many optimizations and variations of this technique, which should be obvious to anyone skilled in the art. For example, it is possible to impose additional restrictions (such as primality) on the choice of the small multiplier j which make it somewhat less likely that faulty computations will remain undetected. Another modification of the technique is to test each half of the computation by a separate recomputation modulo a different small modulus, rather than by comparing the two results modulo a common small modulus. More precisely, the implementation can choose two small numbers j__1 and j__2, and then compute the following quantities:

v__1=x (mod j__1*p), v__2=x (mod j__2*q), v__3=x (mod j__1), v__4=x (mod j__2);

d__1=d (mod phi(j__1*p)), d__2=d (mod phi(j__2*q)), d__3=d (mod phi(j__1)), d__4=d (mod phi(j__2));

w__1=v__1^d__1 (mod j__1*p), w__2=v__2^d__2 (mod j__2*P), w__3=v__3^d__3 (mod j__1), w__4=v__4^d__4 (mod j__2).

To check the correctness of the computation, the black box verifies that w__1=w__3 (mod j__1) and w__2=w__4 (mod j__2) The only expensive operations are the computation of w__1 and w__2, since the small exponentiations in the computation of w__3 and w__4 are very efficient. This recomputation technique is slower than the original comparison technique, but may be slightly more resistant to certain types of non-random faults.

While the invention has been described with respect to certain embodiments thereof, it will be appreciated by one skilled in the art that variations and modifications may be made without departing from the spirit and scope of the invention.

BIBLIOGRAPHY

1. E. Biham and A. Shamir, "A New Cryptanalytic Attack on DES", technical report, 10/18/96. An Extended version appears in the Proceedings of Crypto 97, August 1997.

2. D. Boneh, R. A. Demillo and R. J. Lipton, "On the Importance of Checking Computations", technical report 9/25/96. An Extended version appears in the Proceedings of Eurocrypt 97, May 1997.

3. P. Kocher, "Cryptanalysis of Diffie-Hellman, RSA, DSS, and Other Systems Using Timing Attacks", technical report, 12/7/95.

What is being claimed is:

1. In a method of implementing public key schemes containing the non-CRT form of the modular exponentiation operation x^d (mod n), the improvement comprising the steps of:

computing or storing the computed value of t=phi(n), where phi is Euler's totient function of the modulus n;

selecting some secret integer i; and replacing the computation of x^d (mod n) by the computation of x^(d+i*t) (mod n);

thereby increasing public key scheme resistance to timing attacks without a twofold slowdown in computation time.

2. In the method of claim 1, the further improvement where i is chosen as a random number in the range for some k.

3. In the method of claim 2, the further improvement where k=32.

4. In a method of implementing public key schemes containing the CRT form of the modular exponentiation operation x^d (mod n) where n=p*q, the improvement comprising the steps of:

selecting some secret integer j;

computing v__1=x (mod j*p), v__2=x (mod j*q), d__1=d (mod phi(j*p)), d__2=d (mod phi(j*q)), w__1=v__1^d__1 (mod j*p), and w__2=v__2^d__2 (mod j*q);

aborting the computation if w__1 and w__2 are not equal modulo j; and otherwise, computing y__1=w__1 (mod p), y__2=w__2 (mod q), and combining them by the Chinese Remainder Theorem to obtain the result of x^d (mod n);

thereby increasing public key scheme resistance to timing and fault attacks without a twofold slowdown in computation time.

5. In the method of claim 4, the further improvement where j is chosen as a prime number.

6. In the method of claim 5, the further improvement where k=32.

7. In the method of claim 4, the further improvement where j is chosen as a random number in the range for some k.

8. In a method of implementing public key schemes containing the CRT form of the modular exponentiation operation x^d (mod n) where n=p*q, the improvement comprising the steps of:

selecting two secret integers j__1 and j__2;

computing v__1=x (mod j__1*p), v__2=x (mod j__2*q), d__1=d (mod phi(j__1*p)), d__2=d (mod phi(j__2*q)), w__1=v__1^d__1 (mod j__1*p), and w__2=v__2^d__2 (mod j__2*q);

computing v__3=x (mod j__1), v__4=x (mod j__2), d__3=d (mod j__1), d__4=d (mod j__2), w__3=v__3^d__3 (mod j__1), and w__4=v__4^d__4 (mod j__2);

aborting the computation if w__3 is not equal to w__1 modulo j__1, or if w__4 is not equal to w__2 modulo j__2; and otherwise, computing y__1=w__1 (mod p), y__2=w__2 (mod q), and combining them by the Chinese Remainder Theorem to obtain the result of x^d (mod n);

thereby increasing public key scheme resistance to timing and fault attacks without a twofold slowdown in computation time.

9. In the method of claim 8, the further improvement where j__1 and j__2 are prime numbers.

10. In the method of claim 8, the further improvement where j__1 and j__2 are chosen as random numbers in the range for some k.

11. In the method of claim 10, the further improvement where k=32.

12. In an apparatus for implementing public key schemes containing the non-CRT form of the modular exponentiation operation x^d (mod n), the improvement comprising:

means for computing or storing the computed value of t=phi(n), where phi is Euler's totient function of the modulus n;

means for selecting some secret integer i; and means for replacing the computation of x^d (mod n) by the computation of x^(d+i*t) (mod n);

thereby increasing public key scheme resistance to timing attacks without a twofold slowdown in computation time.

13. In the apparatus according to claim 12, the improvement where i is chosen as a random number in the range for some k.

14. In the apparatus according to claim 13, the further improvement where k=32.

15. In an apparatus for implementing public key schemes containing the CRT form of the modular exponentiation operation $x^d \pmod{n}$ where $n = p*q$, the improvement comprising:

means for selecting some secret integer j;

means for computing $v\_1 = x \pmod{j*p}$, $v\_2 = x \pmod{j*q}$, $d\_1 = d \pmod{\phi(j*p)}$, $d\_2 = d \pmod{\phi(j*q)}$, $w\_1 = v\_1^{d\_1} \pmod{j*p}$, and $w\_2 = v\_2^{d\_2} \pmod{j*q}$;

means for aborting the computation if $w\_1$ and $w\_2$ are not equal modulo j; and otherwise, means for computing $y\_1 = w\_1 \pmod{p}$, $y\_2 = w\_2 \pmod{q}$, and combining them by the Chinese Remainder Theorem to obtain the result of $x^d \pmod{n}$;

thereby increasing public key scheme resistance to timing and fault attacks without a twofold slowdown in computation time.

16. In the apparatus according to claim 15, the further improvement where j is chosen as a prime number.

17. In the apparatus according to claim 16, the further improvement where k=32.

18. In the apparatus according to claim 15, the further improvement where j is chosen as a random number in the range for some k.

19. In an apparatus for implementing public key schemes containing the CRT form of the modular exponentiation operation $x^d \pmod{n}$ where $n = p*q$, the improvement comprising:

means for selecting two secret integers $j\_1$ and $j\_2$;

means for computing $v\_1 = x \pmod{j\_1*p}$, $v\_2 = x \pmod{j\_2*q}$, $d\_1 = d \pmod{\phi(j\_1*p)}$, $d\_2 = d \pmod{\phi(j\_2*q)}$, $w\_1 = v\_1^{d\_1} \pmod{j\_1*p}$, and $w\_2 = v\_2^{d\_2} \pmod{j\_2*q}$;

means for computing $v\_3 = x \pmod{j\_1}$, $v\_4 = x \pmod{j\_2}$, $d\_3 = d \pmod{j\_1}$, $d\_4 = d \pmod{j\_2}$, $w\_3 = v\_3^{d\_3} \pmod{j\_1}$, and $w\_4 = v\_4^{d\_4} \pmod{j\_2}$;

means for aborting the computation if $w\_3$ is not equal to $w\_1$ modulo $j\_1$, or if $w\_4$ is not equal to $w\_2$ modulo $j\_2$; and otherwise, means for computing $y\_1 = w\_1 \pmod{p}$, $y\_2 = w\_2 \pmod{q}$, and combining them by the Chinese Remainder Theorem to obtain the result of $x^d \pmod{n}$;

thereby increasing public key scheme resistance to timing and fault attacks without a twofold slowdown in computation time.

20. In the apparatus according to claim 19, the further improvement where $j\_1$ and $j\_2$ are prime numbers.

21. In the apparatus according to claim 19, the further improvement where $j\_1$ and $j\_2$ are chosen as random numbers in the range for some k.

22. In the apparatus according to claim 21, the further improvement where k=32.

* * * * *

UNITED STATES PATENT AND TRADEMARK OFFICE
CERTIFICATE OF CORRECTION

PATENT NO.    : 5,991,415
DATED         : November 23, 1999
INVENTOR(S)   : Adi Shamir It is certified that error appears in the above-identified patent and that said Letters Patent is hereby corrected as shown below:

Column 7,
Lines 61-63, please correct claim 2 to read as follows:

2. In the method of claim 1, the further improvement where i is chosen as a random number in the range $[0,(2^k)-1]$ for some k.

Column 8,
Lines 20-22, please correct claim 7 to read as follows:

6. In the method of claim 5, the further improvement where j is chosen as a random number in the range $[0,(2^k)-1]$ for some k.
Lines 18-19, please correct claim 6 to read as follows:

7. In the method of claim 6, the further improvement where k=32.
Lines 47-49, please correct claim 10 to read as follows:

10. In the method of claim 8, the further improvement where j_1 and j_2 are chosen as random numbers in the range $[0,(2^k)-1]$ for some k.
Lines 65-67, please correct claim 13 to read as follows:

13. In the apparatus according to claim 12, the further improvement where i is chosen as a random number in the range $[0,(2^k)-1]$ for some k.

Column 9,
Lines 25-27, please correct claim 18 to read as follows:
17. In the apparatus according to claim 15, the further improvement where j is chosen as a random number in the range $[0,(2^k)-1]$ for some k.
Lines 23-24, please correct claim 17 to read as follows:

18. In the apparatus according to claim 17, the further improvement where k=32.

UNITED STATES PATENT AND TRADEMARK OFFICE
CERTIFICATE OF CORRECTION

PATENT NO. : 5,991,415
DATED : November 23, 1999
INVENTOR(S) : Adi Shamir

It is certified that error appears in the above-identified patent and that said Letters Patent is hereby corrected as shown below:

<u>Column 10,</u>
Lines 21-23, please correct claim 21 to read as follows:

21. In the apparatus according to claim 19, the further improvement where $j\_1$ and $j\_2$ are chosen as random numbers in the range $[0,(2^k)-1]$ for some k.

Signed and Sealed this

Fourth Day of May, 2004

JON W. DUDAS
*Acting Director of the United States Patent and Trademark Office*